United States Patent [19]
Johinke

[11] Patent Number: 4,790,111
[45] Date of Patent: Dec. 13, 1988

[54] REDUCING HOOP STRESS IN SILOS

[75] Inventor: Bruce L. Johinke, Kent Town, Australia

[73] Assignee: South Australian Co-Operative Bulk Handling Limited, Australia

[21] Appl. No.: 118,531

[22] Filed: Nov. 6, 1987

Related U.S. Application Data

[63] Continuation-in-part of Ser. No. 726,030, Apr. 23, 1985.

[51] Int. Cl.$^4$ .............................................. B65G 65/34
[52] U.S. Cl. ...................................... 52/197; 52/195; 222/149; 222/196; 222/482; 222/564; 414/319
[58] Field of Search ............................ 52/192–197, 52/245, 248, 249; 222/482, 488, 564, 149, 464, 196; 414/297, 319, 324

[56] References Cited

U.S. PATENT DOCUMENTS

| | | | |
|---|---|---|---|
| 1,758,662 | 5/1930 | Heath | 52/197 X |
| 3,233,796 | 2/1966 | Reimbert | 222/564 X |
| 3,341,090 | 9/1967 | Reimbert | 222/564 X |
| 3,490,655 | 1/1970 | Ledgert | 222/564 X |
| 4,372,466 | 2/1983 | Reimbert | 222/482 |
| 4,444,338 | 4/1984 | Reimbert | 222/149 |

FOREIGN PATENT DOCUMENTS

| | | | |
|---|---|---|---|
| 1081986 | 12/1954 | France | 52/197 |
| 270032 | 7/1964 | Netherlands | 52/197 |
| 7704918 | 2/1979 | Sweden | 222/564 |
| 800327 | 1/1981 | U.S.S.R. | 52/192 |
| 481248 | 3/1938 | United Kingdom | 52/195 |

Primary Examiner—David A. Scherbel
Assistant Examiner—Richard E. Chilcot, Jr.
Attorney, Agent, or Firm—Baker, Maxham & Jester

[57] ABSTRACT

Means for reducing hoop stress in a silo cell comprising a grain tube located in the lower part of the silo cell, the wall of the grain tube having apertures at the silo base allowing entry of granular material into the grain tube, and a restrictor below the apertures restricting the material flow so that when the silo cell first discharges the material, all of that discharge is through the upper ends of the tube, downwardly through the tube and outwardly from the silo cell through valve means beyond the lower end of the tube and restrictor.

18 Claims, 6 Drawing Sheets

REDUCING HOOP STRESS IN SILOS

REFERENCE TO RELATED APPLICATION

The present application is a continuation-in-part of my co-pending application Ser. No. 726,030, filed Apr. 23, 1985, and entitled "REDUCING HOOP STRESS IN SILOS".

BACKGROUND OF THE INVENTION

This invention relates to a means and method for the reduction of hoop stress in silos which contain grain, or other bulk solids.

Many silos, which were built before the dynamics of discharge, were fully understood and designed for static loading, but it has been shown that material pressures exerted on the cell walls increases by a factor of up to about two and a half when the outloading valve is opened and material begins to move.

The opening of the valve removes vertical support from the material directly about it and the stress field changes from "peaked", with lines of major stress vertical, or near vertical, to "arched" with lines of major stress arching across the cell.

The "arched" stress field occupies a conical zone which diverges upwardly. At the point where this conical zone intersects the cell walls, the large lateral component of force causes a high hoop stress in the cell walls. This stress exceeds the static stress by a factor of up to two and a half, and is often large enough to cause overstressing and cracking of cell walls.

The cost of replacement of a silo is prohibitive, and the main object of this invention is to provide improvements whereby the hoop stress can be substantially reduced.

Several methods are available to strengthen the cylindrical walls of an upstanding silo. One widely used (but basically unsound) method, is the repair of bulged areas, but even this is expensive. The second alternative is the use of external strapping on the external surfaces of external cells only of a group of silos, but this is many times more expensive than the cost of local bulge repairs. Another possibility which has been examined has been the use of a steel liner spirally wound within a silo to lie against the inner surface of a concrete wall, but this is even more expensive than the external strapping. The other alternative (apart from this invention) is the use of a concrete liner constructed for the full height of the cell and within an old cell, but the cost of this is so great that it is not viable.

The object of this invention is to provide improvements which are economical and feasible. STATE OF THE ART This problem has already been the subject of various studies and the following references are pertinent:

(a) Arnold, P. C., McLean, A. G. and Roberts, A. W. BULK SOLIDS: STORAGE, FLOW AND HANDLING. Tunra Bulk Solids Handling Research Associates.
(b) Jenike, A. S. GRAVITY FLOW OF BULK SOLIDS, BULLETIN 108, Utah Engineering Experiment Station, University of Utah.
(c) Riembert, M. & A. SILOS, THEORY AND PRACTICE, Trans Tech Publications, 1976.
(d) Warner, R. F. STRENGTHENING STIFFENING AND REPAIR OF CONCRETE STRUCTURES, IABSE SURVEYS 17/81.
(e) Reimbert, A. U. S. Pat. No. 4,372,466.

The reader's attention is drawn to a central tube known as an "anti-dynamic tube" proposed by Riembert, and this employs a tube containing a plurality of apertures throughout its length, placed at the cell center and extending for full cell height, and supported by guy wires fixed to the cell wall. In principle, the tube and portholes are intended to ensure that the grain flows into the tube only close to the grain surface, thus emptying the cell from the top downwards. No mass flow occurs, and no switch pressures are generated against the cell walls. Although there is available supporting literature, there appears to be some practical problems. The small portholes are liable to blockage, thus causing unsymmetrical flow, which in turn generates large lateral forces on the tube with the possibility of collapse. If flow into the tube is able to occur at lower tube levels than close to the free grain surface, there will be mass flow within the bin.

The Reimbert U. S. Pat. No. 4,372,466 also discloses use of a central tube (5) which had imperforate walls, and was separately valved from the rest of the silos. Although this arrangement is capable of effective use, it is also capable of incorrect use, and if for example, the second discharge orifice (4) is opened before the first discharge orifice (3), the arrangement is ineffectual, and high stresses can be imparted to the silo walls.

Many silo cells have a height to diameter ratio of about three, and the hoop stress is excessive only when the ratio exceeds about 1.5 (depending upon the grain used and its moisture content), and this invention seeks to resolve the excessive hoop stress by dividing a silo cell into a plurality of notional cells one about the other.

SUMMARY AND OBJECTS OF THE INVENTION

It is the primary object of the present invention to provide an improved system for reducing silo hoop stress.

In accordance with a primary aspect of this invention, a system for reducing the hoop stress in a silo includes an open ended tube in the lower part of a silo cell, the wall of the open ended tube having apertures near the silo base allowing the entry of granular material and a restrictor (or choke) below the apertures, restricting the material flow, so that when the silo cell first discharges the material, all of that discharge is through the upper end of the tube, downwardly through the tube, and outwardly from the silo cell through valve means beyond the lower end of the tube and restrictor.

BRIEF DESCRIPTION OF THE DRAWINGS

Embodiments of the invention are described hereunder in some detail with reference to and are illustrated in the accompanying drawings in which.

DETAILED DESCRIPTION OF A PREFERRED EMBODIMENT

Figure 1:
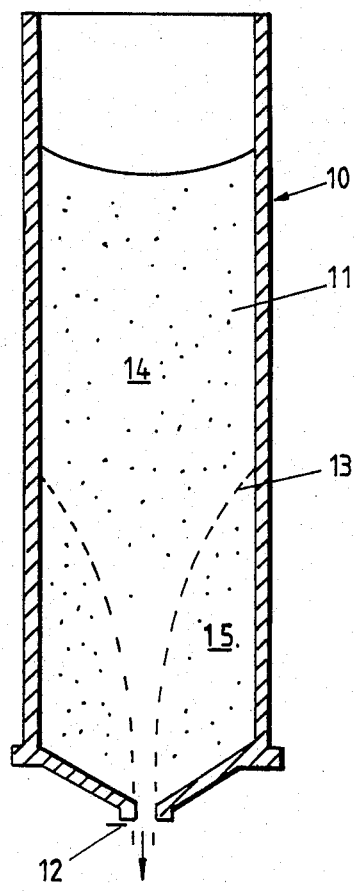
FIG. 1 illustrates a silo cell showing how grain will discharge in a conical or funnel manner.

In accordance with this invention, a system for reducing the hoop stress in a silo includes an open ended tube in the lower part of a silo cell, the wall of the open ended tube having apertures near the silo base, allowing the entry of granular material and a restrictor (or choke) below the apertures, restricting the material flow, so that when the silo cell first discharges the material, all of that discharge is through the upper end of the tube, downwardly through the tube, and outwardly from the silo cell through valve means beyond the lower end of the tube and restrictor. The restrictor below the tube apertures causes the granular material in the tube to back up and ensures that, during that initial discharge, the tube remains full and granular material does not flow through those apertures from the silo cell.

More specifically, the invention comprises means for reducing hoop stress in a silo of the type having upstanding cylindrical walls, comprising a grain tube having an open upper end located centrally within the silo and upstanding from its base and extending part way up a cell, apertures through the wall of the tube lower end and symmetrical about the central vertical axis of the tube, a restrictor beneath the apertures restricting flow through the tube, valve means at the lower end of the tube below the restrictor, and support means supporting the upper end of the tube from said cylindrical silo walls.

The zone of granular material flow causing dynamic forces when grain begins to move upon opening of the outloading valve, is approximately conical in shape and will have a variation of included cone angle dependent on the material type used, and the environmental conditions within the silo cell. However, the highest pressure, which would otherwise be imparted to the silo walls, will be avoided if this cone extends through the surface of the grain, or to the walls near that surface, and not at the interface between the grain and the inner surface of the silo cell wall at an effective distance below the surface. Since the cone angle is likely to be small and its point of intersection with the cell wall relatively elevated, it is usually sufficient to have within a silo cell a tube with apertures at the base only, and this greatly reduces the incidence of very high pressures if the upper part of the silo is emptied first before any material flow or emptying begins in the lower part. However, for very tall, narrow, silos, a tube may require further apertures, for example at a height of 1.5× silo diameter about the base.

The lateral forces imposed on the tube can be considerable in the event of asymmetrical flow of the material, and it is necessary to limit the possibility of such flow by having the tube apertures symmetrical, and most bulk of the tube body centrally placed within the silo cell, but nevertheless to resist those forces it is desirable that support stays should be of sufficient cross-sectional area and of sufficiently high tensile material that such loads will be fully resisted with a minimum of further damage to the walls of the silo.

Referring first to FIG. 1, which is representative of prior art, a silo cell 10 contains grain 11 which discharges through a gate valve 12 shown diagrammatically, and in so doing there is an interface 13 between the flowing grain 14 and the stationary grain 15, and it is the existence of this interface which causes hoop stresses in the walls of silo 10, which are in the order of two and a half times greater than the static stresses for which many silos have been designed.

Figure 2:
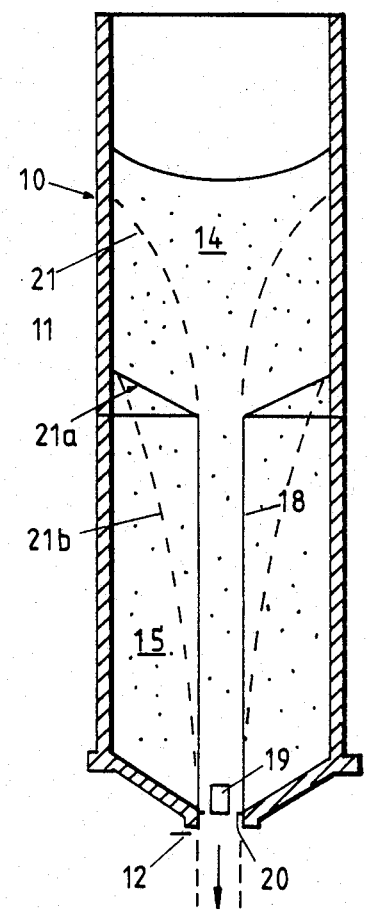
FIG. 2 shows diagrammatically the modification of a silo cell according to this invention.

FIG. 2 illustrates a first exemplary embodiment of this invention. As will be seen from FIG. 2, an open ended tube 18 is imperforate except for apertures 19 at its lower end (there being four in all). These apertures 19 are symmetrically positioned about the tube and above a restrictor or choke 20. In this embodiment, choke plate 20, may be an annular plate or moveable diaphragm at the lower end of the open ended tube 18, and located above the gate valve 12. The upper end of the tube 18 is preferably located co-axially at the silo, but the lower end can be offset therefrom as will be subsequently explained.

The existence of a choke plate 20 causes the granular material to back up in the tube and increases the pressure in the tube above it, and reduces the likelihood of grain flowing through apertures 19 until the grain above the open ended tube 18 has discharged.

During the discharge of the flowing grain 14 above the tube 18, an interface 21 develops, but this is so high in the cell that it is located in a low pressure area and will not impart excessive hoop stress to the cell walls. In some instances, interface 21 will pass through the surface of the grain and thereby impart no dynamic forces at all to the cell walls. However, once the flow has taken place and grain ceases to discharge from above the tube 18, it will adopt an elevated conical surface (21a) above the top of the tube, and further outward flow will then take place through apertures 19, and by this time the pressure will be reduced so that excessive hoop stresses will not be imparted to the silo cell walls.

Figure 3:
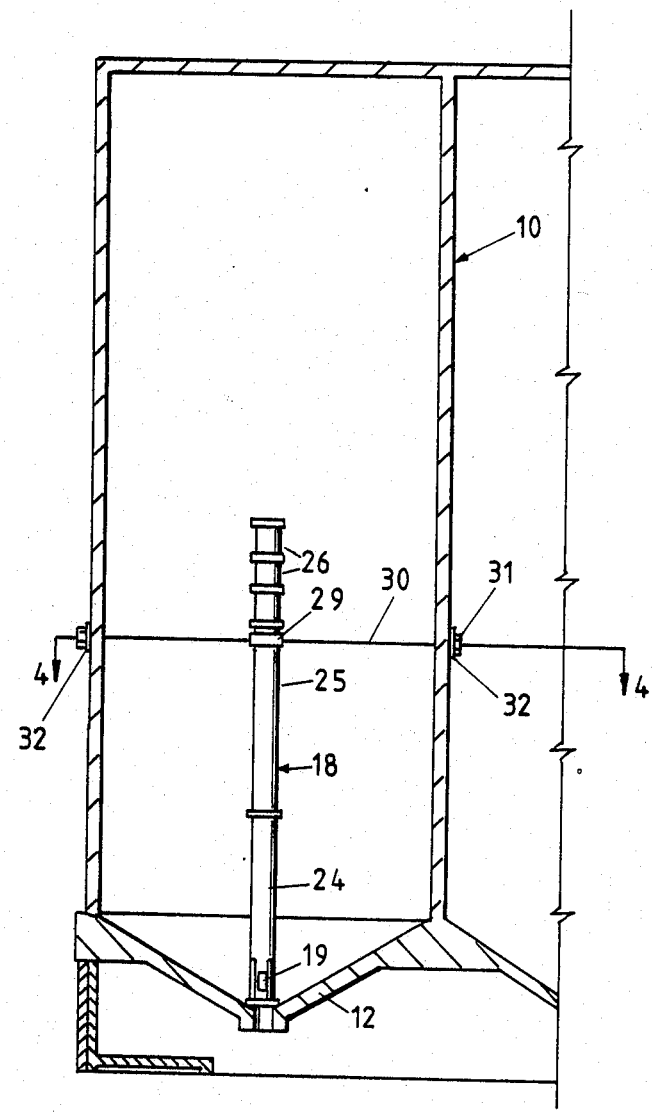
FIG. 3 is a section through a cell showing the details of construction and the open ended tube therein.

As shown in FIG. 3, the open ended tube 18 comprises a lower portion 24, an upper portion 25 and a plurality of upper extensions 26, which can be arranged so that the effective length of the open ended tube 18 can be adjusted for optimum working conditions. It will be seen that the tube 18, even with extensions, does not extend as high as half way up the cell 10.

Near the upper end of the upper portion 25 of tube 18, there is provided a band 29 which extends around it, and this is held fast to the walls of cell 10 by support stays 30, which extend through the walls and are secured with nuts 31, which abut bearer plates 32.

Figure 4:
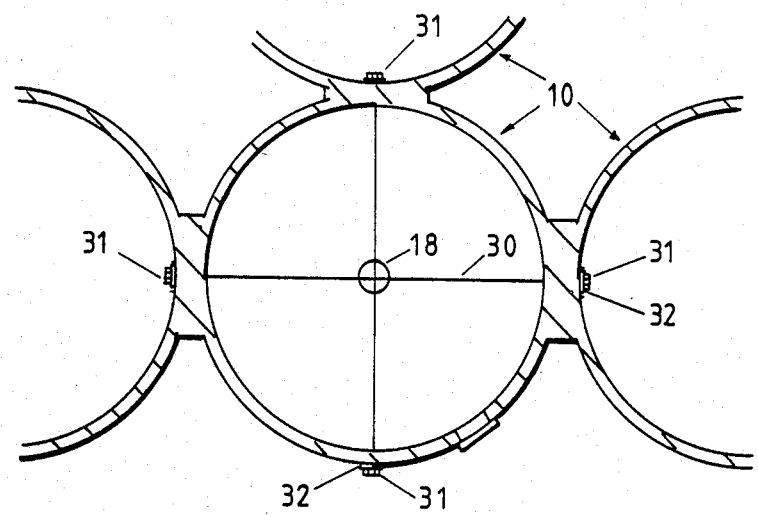
FIG. 4 is a section on line 4—4 of FIG. 3 which indicates the manner in which the support stays are utilized.

FIG. 4 illustrates some details of construction of multiple silos which embody the invention. As illustrated in FIG. 4, the stays 30 are shown best secured to a silo which is part of a group of silos.

Figure 10:
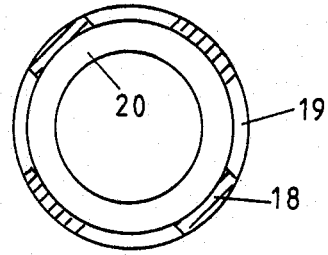
FIG. 10 is a section view on line X—X of FIG. 5.
Figure 5:
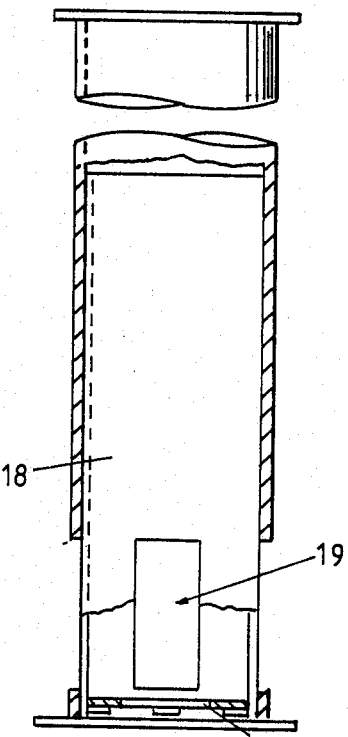
FIG. 5 shows the construction of the open ended tube.

Referring to FIG. 5, details of construction of the lower end of grain tube 18 are illustrated. As illustrated, a plurality of apertures 19 are formed in the wall of the tube 18. Positioned just below these apertures 19 is the restrictor or choke plate 20, which may rest on outwardly extending tabs or other suitable mounting means. A top view of the choke plate 20 is best illustrated in FIG. 10, which shows it to be a circular plate with an aperture through the center thereof.

Figure 6:
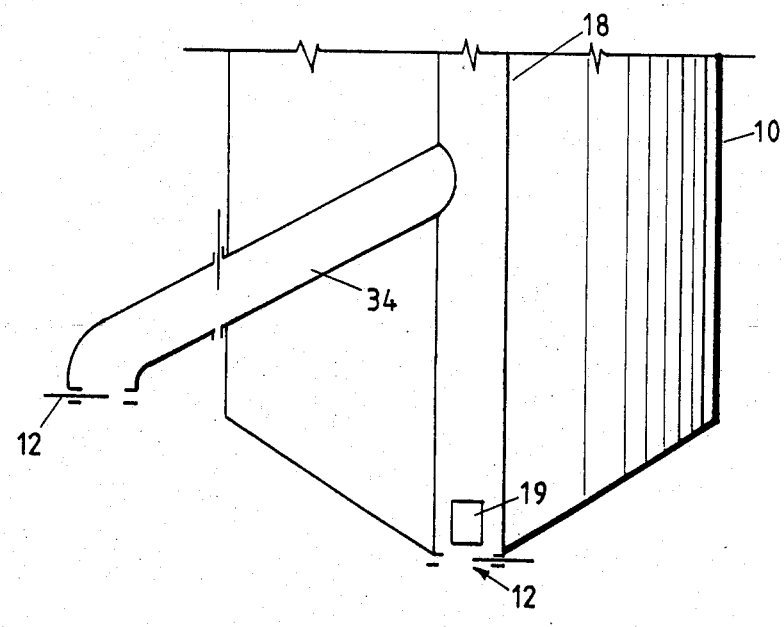
FIG. 6 is a diagrammatic view of a silo wherein there is an additional side discharge tube.

FIG. 6 shows how the invention is applied to a silo having a side discharge tube 34, which projects from grain tube 18 through the wall of silo 10, and also terminates in a gate valve 12.

Figure 7:
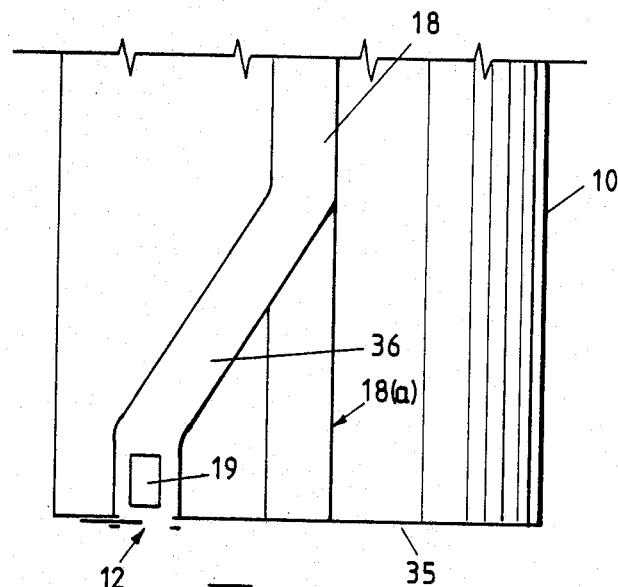
FIG. 7 is a diagrammatic view of a silo wherein a flat bottom silo has a discharge valve near one edge.

As illustrated in FIG. 7, silo 10 has a flat bottom 35, and the discharge is offset, gate valve 12 being near a side wall of the silo. Grain tube 18 has an offset or sloping portion 36 near its lower end that slopes away from the upper end portion. There is illustrated a support structure 18a below the upper vertical portion of the grain tube 18.

Figure 8:
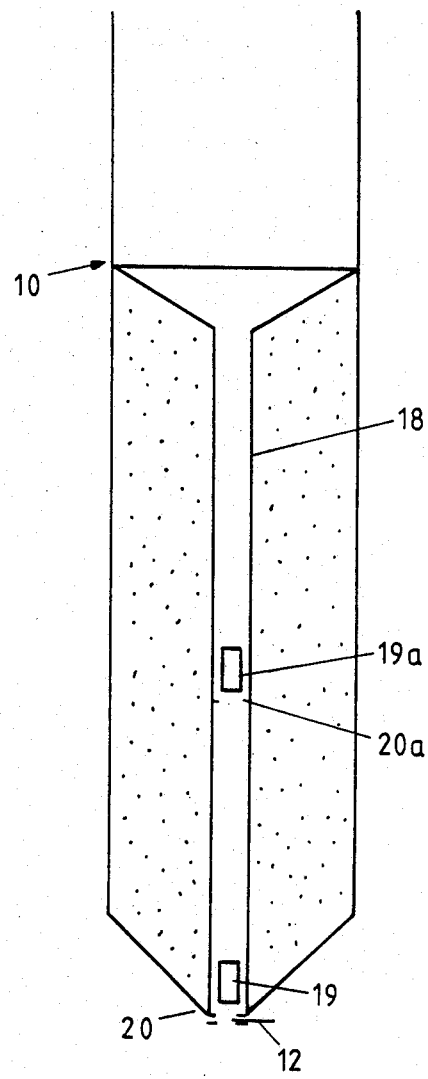
FIG. 8 is a diagrammatic view of a silo wherein the height/diameter ratio exceeds 3:1.

FIG. 8 illustrates an arrangement wherein the silo 10 is very tall, exceeding three times its diameter. In this embodiment, the silo has a grain tube 18, which extends for nearly two-thirds of its height, and an intermediate set of apertures 19a set just above an upper choke level plate 20a. In some applications, such a choke plate will not be required. The diameter of the aperture of choke plate 20a exceeds that of choke plate 20, so that the flow through choke plate 20a will exceed that of 20. After the contents of the upper end of silo 10 have been discharged, a secondary discharge will take place through apertures 19a, before a tertiary discharge through apertures 19.

Figure 9:
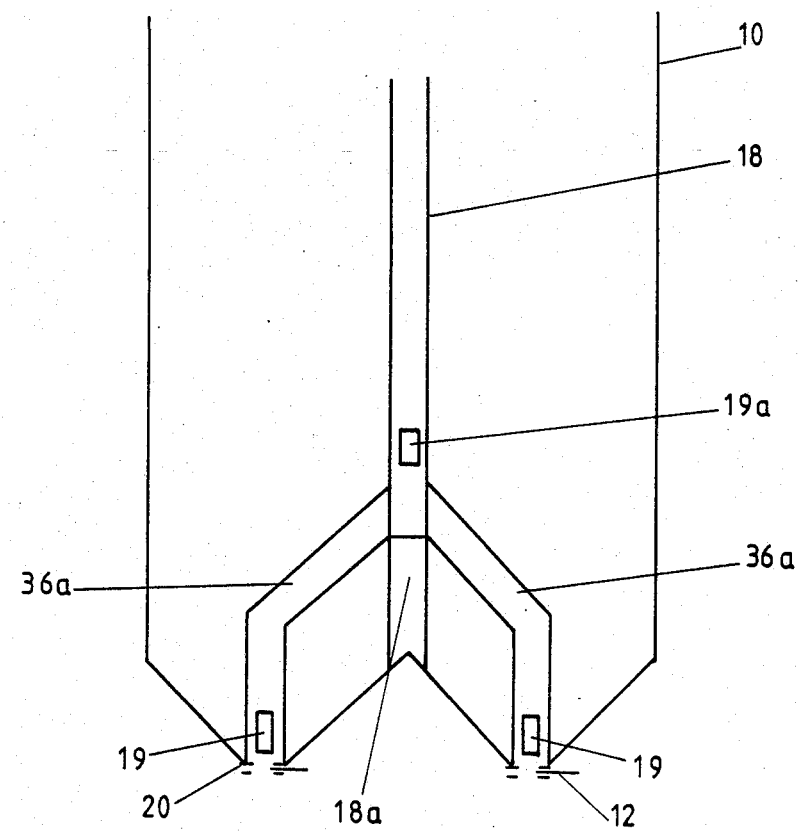
FIG. 9 is a diagrammatic view of a silo wherein the silo has more than one discharge valve in the bottom, in this case two discharge locations.

In FIG. 9, silo 10 has two discharge outlets, each with gate valve 12 offset from the silo centerline. The grain tube 18 is bifurcate below an intermediate set of apertures 19a into two sloping portions of tube, 36a, each with a lower set of apertures 19, with choke plates 20. There is a support structure 18a below the vertical portion of the grain tube.

In operation, as grain flows within the system, it acts much like a fluid system with very similar pressure characteristics. A high velocity flow over a surface causes a reduced pressure on that surface. In the present system, as can be appreciated from FIGS. 5 and 10, the restrictor 20 reduces the flow of grain in the tube 18 and causes it to back-up in the tube and along the walls above the plate, and therefore increases the pressure on the inner walls above the choke plate 20 in this area. This acts to hold back the grain in the silo, attempting to enter at or through the apertures 19 until the flow of grain down the tube from above stops. Without the restrictor, the pressure within the tube from the flow of grain in the tube would drop below that outside the tube, causing a high rate of flow of grain through the apertures 19 reducing or choking off the flow along the tube from above.

Tests have indicated that notwithstanding the simplicity and low cost of this invention, hoop stress within the silo can be reduced very considerably, and this avoids the excessive costs of replacement or expensive repairs referred to herein.

Operation is entirely automatic, and danger of unsymmetrical flow or other malfunction is slight. The invention is easily applied to existing silos with a minimum of rework.

What is claimed is:

1. Means for reducing hoop stress in a grain silo of the type having cylindrical walls upstanding from a base and defining therewith a cell having an outlet adjacent said base comprising, an upstanding grain tube located centrally within the silo and extending part way up said cell, support means for supporting the upper end of said tube on said side walls, said tube including a side wall and having an open upper end and an open lower end communicating with said outlet, said tube side wall being provided with a plurality of apertures adjacent said lower end arranged symmetrically about the central vertical axis of said tube, a gate valve for closing said base outlet and for opening said base outlet to permit grain above said tube upper end to enter said tube upper end and flow downwardly through said tube out said base outlet, and a restrictor in said tube below and operatively associated with said apertures to restrict the flow of grain from said cell into said tube through said apertures during said grain flow until the grain level in said cell corresponds to the level of the upper end of said tube and thereafter to permit grain flow from said cell into said tube through said apertures out said base outlet.

2. Hoop stress reducing means according to claim 1 wherein the wall of said grain tube is imperforate between said apertures and the tube upper end.

3. Hoop stress reducing means according to claim 1 wherein said tube has a second set of apertures between its upper and lower ends, a second restrictor beneath said second set of apertures but above the first said set of apertures, the area of the flow opening of said second restrictor exceeding that of the first said restrictor.

4. Hoop stress reducing means according to claim 1 wherein said support means comprise stays radiating from said grain tube, and anchor means anchoring said stays to the grain silo wall.

5. Hoop stress reducing means according to claim 1 further comprising a band extending around and locked to the wall of the silo, said support means comprising stays radiating from the open ended tube to the band.

6. Hoop stress reducing means according to claim 1 wherein said open ended tube comprises upper extensions.

7. Hoop stress reducing means according to claim 2 wherein said tube has a second set of apertures between its upper and lower ends, a second restrictor beneath said second set of apertures but above the first said set of apertures, the area of the flow opening of said second restrictor exceeding that of the first said restrictor.

8. Hoop stress reducing means according to claim 7 wherein said open ended tube comprises upper extensions.

9. Hoop stress reducing means according to claim 8 wherein said support means comprise a band extending around and locked to the wall of the silo, and stays radiating from the open ended tube to the band for anchoring said stays to the grain silo wall.

10. Hoop stress reducing means according to claim 9 wherein said open ended tube comprises upper extensions.

11. A grain storage facility, comprising:
   a storage vessel defined by a vertically extending cylindrical wall having a base and a top;
   an elongated cylindrical discharge tube having a vertically oriented open upper end defining a first inlet positioned coaxially within said vessel between the base and the top of said vessel and a second inlet at the base of the vessel for discharging granular substance from said vessel, said second inlet being a symmetrical array of apertures about the axis of said tube; and
   a symmetrical restriction in said tube below said second inlet for restricting flow of grain along said tube and thereby restricting flow of grain into said tube through said apertures while grain is flowing through said tube via said first inlet.

12. A grain storage facility according to claim 11 wherein:

said first inlet is positioned between about one-quarter and one-half the distance from the base to the top of the vessel.

13. A grain storage facility according to claim 11 wherein:
   said tube includes a third inlet defined by a set of apertures between said upper end and said second inlet, second symmetrical restriction means below said second set of apertures and above said first apertures and being less restrictive than said first restriction means.

14. A grain storage facility according to claim 11 wherein:
   said discharge tube includes a gate valve at the outlet thereof.

15. A grain storage facility according to claim 11 wherein:
   said second inlet is offset from the axis of said vessel.

16. A grain storage facility according to claim 12 wherein:
   said tube includes a third inlet defined by a set of apertures between said upper end and said second inlet, second symmetrical restriction means below said second set of apertures and above said first apertures and being less restrictive than said first restriction means.

17. A grain storage facility according to claim 16 wherein:
   said discharge tube includes a gate valve at the outlet thereof.

18. A grain storage facility according to claim 17 wherein:
   said second inlet is offset from the axis of said vessel.

* * * * *